June 23, 1970     T. J. O'HARGAN ET AL     3,516,446
INSIDE REPAIR CLAMP

Filed Jan. 26, 1968     3 Sheets-Sheet 1

INVENTORS
THOMAS J. O'HARGAN,
MICHAEL P. YOKE &
BY JAMES J. VAN HOUTTE

ATTORNEY

INVENTORS
THOMAS J. O'HARGAN,
MICHAEL R. YOKE &
BY JAMES U. VAN HOUTTE

ATTORNEY

June 23, 1970   T. J. O'HARGAN ET AL   3,516,446
INSIDE REPAIR CLAMP
Filed Jan. 26, 1968   3 Sheets-Sheet 3
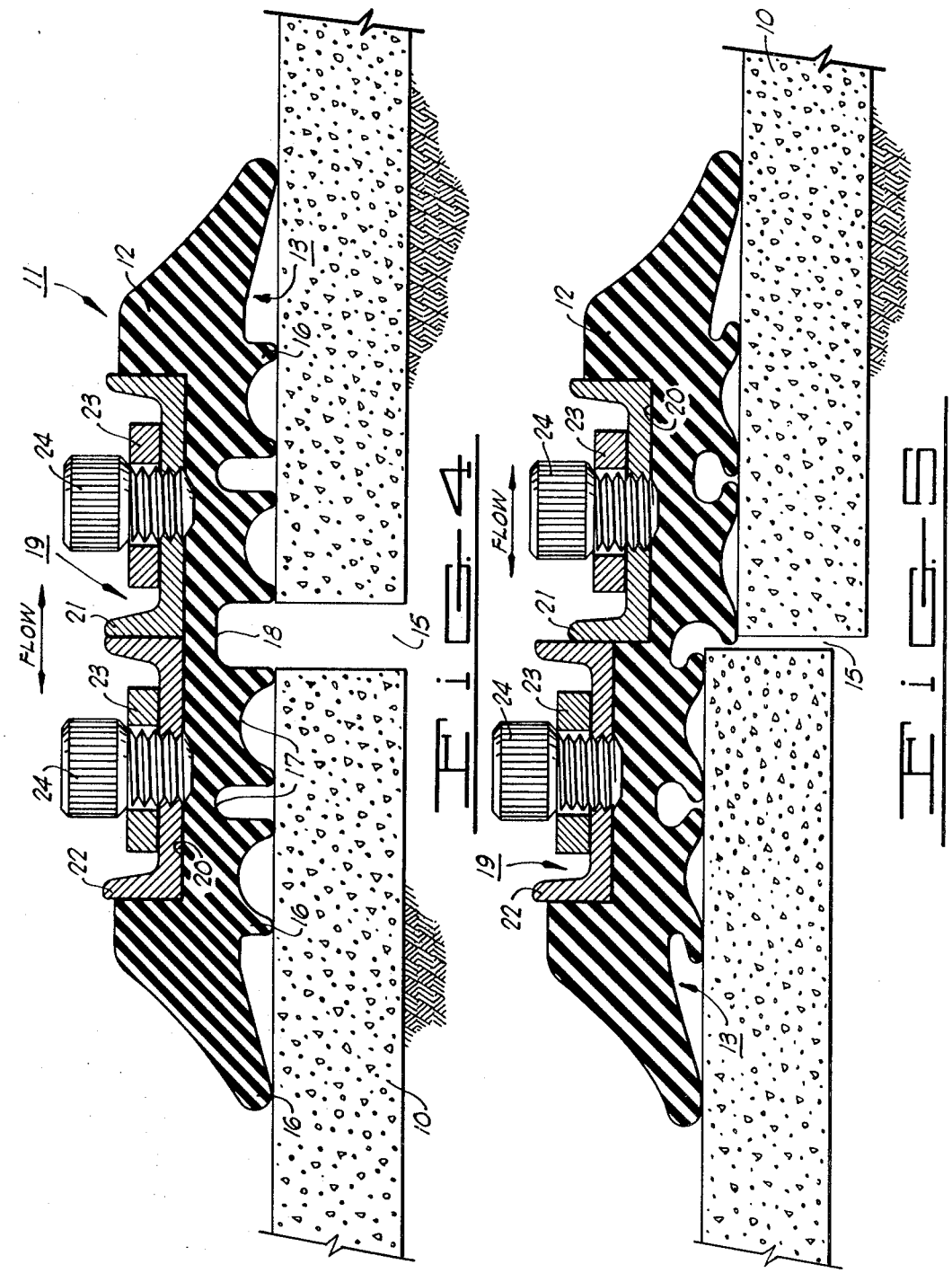
INVENTORS
THOMAS J. O'HARGAN,
MICHAEL P. YOKE &
BY JAMES J. VAN HOUTTE
ATTORNEY

United States Patent Office

3,516,446
Patented June 23, 1970

3,516,446
INSIDE REPAIR CLAMP
Thomas J. O'Hargan, Michael P. Yoke, and James J. Van Houtte, Bradford, Pa., assignors to Dresser Industries, Inc., Dallas, Tex., a corporation of Delaware
Filed Jan. 26, 1968, Ser. No. 700,957
Int. Cl. F16l 55/18
U.S. Cl. 138—97                                             10 Claims

ABSTRACT OF THE DISCLOSURE

A clamp for the repair of pipe leaks having an annular gasket seal supported against the internal pipe surface axially spanning the area of leak. A circumferential backing ring extending about the gasket maintains a predetermined circumferential compression against the gasket which receives additional sealing compression from the pressurized line contents in the pipe.

Background of the invention (1) The field of art to which the invention pertains includes the art of Pipe and Tubular Conduits, Patent Office class 138, and Pipe Joints or Couplings, Patent Office class 285.

(2) Clamps for repair of pipe leaks at a joint or elsewhere in the system are well-known in industry and are widely marketed commercially. It is customary to apply these prior type clamps to the external pipe surface in the vicinity of the leak whereby to effectively contain the pressurized line contents thereat. However, a frequent repair of this type relates to buried, underground piping wherein it is necessary to externally excavate in order to gain complete circumferential access to the leak site. Where only a single leak exists within the piping system, the cost of a single excavation is regarded as unavoidable and properly endured as a necessary expense. However, many of the buried pipe systems of this type are of large pipe size, frequently on the order of 30 inches and above, for distributing water to a major metropolitan city and have been in use for many years. Because of being buried, leaks have gone undetected and after an extensive period of time, the pipes have developed leaks generally throughout the entire piping length. The usual location for such leaks is at the joint between pipe sections from which the lead caulking has gradually given way by pipe settling, erosion or the like. While repair is usually considered more economically plausible than replacement of the entire system, an extensive old system literally requires thousands of clamps to effect a complete leak-proof repair. It can be appreciated that where thousands of leaks exist in any known system, each separated from the next and the preceding by, for example, a length of pipe section, that the identical number of external excavations results in a near prohibitive repair cost. At the same time, the multiplicity of excavations frequently cause gross inconvenience both to local automobile traffic and possible prolonged interruption of pipe service.

Inside clamps for the repair of gas line piping on this order of size have achieved a high order of commercial success and are exemplified by Hoke U.S. Pat. 3,101,743. The Hoke clamp employs a plurality of circumferentially spaced, axially directed bolts by which the follower pressure is maintained against an elastomeric seal placed over the leakage site.

Summary

This invention relates to a pipe repair clamp suitable for inside installation against the leak area. The clamp is particularly adapted for use within water piping of crock or concrete and at least partially employs the pressure of the pipe line contents for maintaining the seal. By being capable of inside repair, the costly expense of multiple excavation is avoided and instead requires only one major excavation at each terminal end of the piping system. With the ends exposed, the pipe where of adequate size can be serviced entirely on the interior. As a further benefit, the interruption of traffic and other public inconvenience as associated with prior type external clamps is minimized to a maximum. Moreover, the time required to complete repair on just the pipe per se is usually substantially less than with external clamps because of the reduced labor time involved. At the same time, the novel construction of the clamp hereof requires a minimum of assembled parts and offers a low radially extending profile which minimizes the pressure drop to the fluid occasioned by its presence in the liquid system.

It is therefore an object of the invention to provide a novel clamp for the repair of pipe leaks.

It is a further object of the invention to provide a novel pipe repair clamp suitable for installation interior of the pipe system as to generally provide a more economical repair with less inconvenience to the public than has been associated with prior type clamps.

It is a still further object of the invention to provide a novel pipe repair clamp for inside installation which is generally simple in construction and at least partially employs the pressure of the flowing line contents for effectively sealing the leak area.

It is yet a further object of the invention to provide an inside repair clamp for liquid line contents having a minimum radial profile to minimize the liquid pressure drop thereacross.

Brief description of the drawings

FIGS. 4 and 5 are each sectional elevations taken substantially along the coincident lines 4—4 and 5—5 respectively of FIG. 2 for different situations of installation;

Referring now to FIG. 1, there is illustrated a pipe 10 of concrete or crock construction that might have been initially jointed with bell and spigot or tongue and groove when laid underground many years before. Within the pipe, extending around the interior periphery thereof, is a pipe clamp in accordance with the invention hereof and generally designated 11. For purposes of the discussion hereafter, the clamp disclosure will be described in conjunction with repairing leaks occurring at the gaps between pipe sections whereat a joint had previously been contained, it being understood that where repairing leaks elsewhere in the pipe wall, the clamp hereof can be constructed with even fewer components as will be explained.

Figure 1:
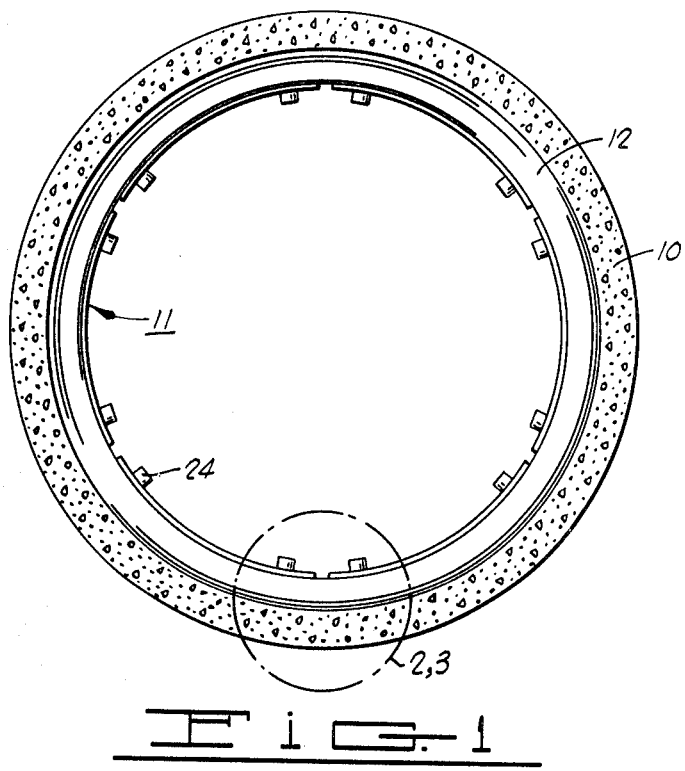
FIG. 1 is a sectional end elevation through a pipe containing the repair clamp in accordance herewith.

Referring more specifically to FIGS. 2–5, the clamp 11 hereof is comprised of an annular elastomeric sealing gasket 12 of a rubberized composition or otherwise compatible with the line contents served by the pipe being repaired. The gasket has a cross-sectional width sufficient to span the leak gap shown here at a joint 15 between pipe sections and to extend laterally onto the pipe wall at each side thereof a distance as will permit line pressure to exert an adequate compressive sealing force thereon. At a pipe gap on the order of about ½ inch with 54 inch diameter pipe, an unstressed total cross-sectional width of about 6½ inches has been found adequate. When finally installed and pressurized under operative conditions, this dimension was found to increase to about 7¼ inches.

The radially outer or exterior surface formation 13 of the gasket facing the inside pipe wall is critical to the invention and is formed of a puckered shape adapted to effect individual series arranged seals in the axial direction of the pipe. As here shown, surface 13 comprises a plurality of axially displaced, annularly extending, alternate ribs or lips 16 and grooves 17 radially engaging the inside pipe surface. The ribs might also be regarded as hills 16 and valleys 17 providing a high degree of flexibility in response to circumferential compression as can be better appreoicated by comparing the relative illustrations of FIGS. 4 and 5. This construction when sealed, prevents both outward leakage of the line contents and inward leakage from ground seepage. The puckered effect responds favorably to any increase in pressure exerted by the line contents yet permits axial offset to exist between the pipe sections in the manner shown in FIG. 5. The gaskets are generally pre-sized to fit the pipe which is to accommodate them and are initially set in place by hand. Where the pipe serves a water supply, it is preferable to initially apply to the gasket a lubricant coating of an edible lubricant such as vegetable shortening or the like. While it is preferable where used for sealing a pipe gap that surface 13 be situated generally symmetrical on each side of a center recess 18, this is not critical and it need not necessarily be so.

In order to secure the gasket in place and apply a minimum circumferential compression thereagainst, there is provided a circumferential ringlike backing member 19 positioned within an annular groove 20 on the radially inner surface of the gasket. The backing member may in cross section be comprised of a single channel but for gap sealing is preferably split circumferentially by a pair of juxtaposed commercial channel sections 21 and 22. This permits centering the split radially coincident with the gap for relative channel displacement as shown in FIG. 5. Each or both channels are formed from an arc on a chord segment for substantially tandem end-to-end circular assembly which maintains the gasket under a predetermined degree of compression. This holds the gasket in place against the velocity component of the fluid until at least after the piping system is refilled with the appropriate liquid to be carried thereby. For 54-inch diameter pipe, approximately 12 segments per backing ring are usually employed to completely fill the inside circumferential extent of the gasket.

Securing the consecutive backing ring segments in end-to-end relation are a plurality of splice plates 23 likewise each in the form of an arc of a chord sufficient to span the abuttable ends of the tandem ring segments. The splice plates fit within the respective channel sides and are attached to the ring segments by means of socket head cap screws 24 which pass through plate apertures 25 and 26 into tapped holes 27 and 28 in the channel wall. It is to be noted that aperture 26 is of a circumferential extent greater than the diameter of screw 24 permitting an adjustable setting of the splice plate relative to the ring segment thereat as will be explained.

Figure 6:
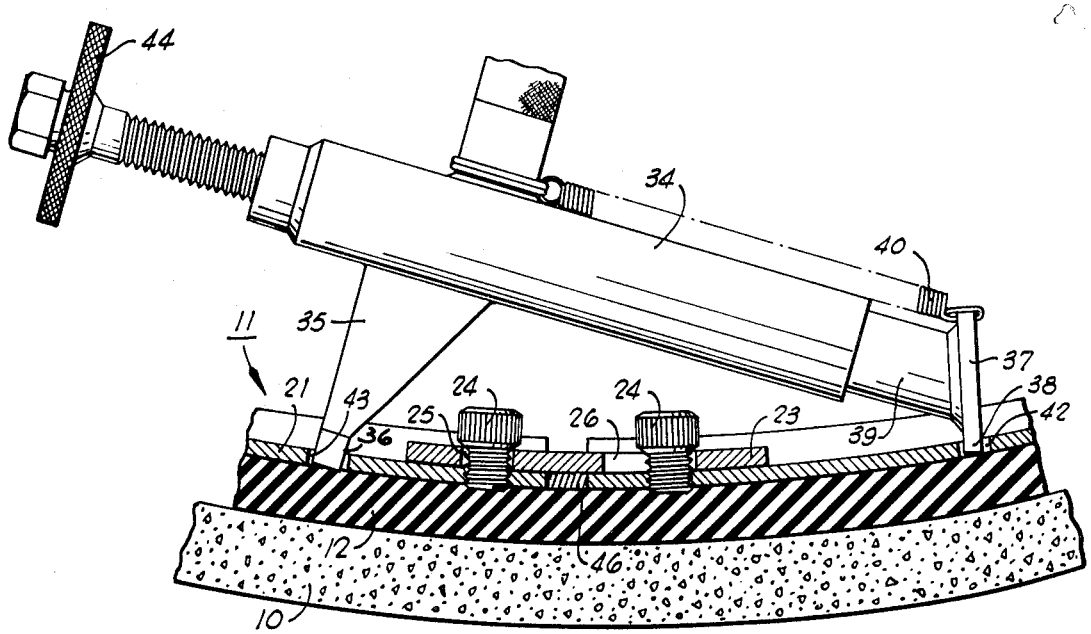
FIG. 6 is a sectional view similar to FIG. 2 indicating the method by which initial assembly of the clamp hereof is effected.

The initial predetermined, preset compression of the backing ring 19 against the gasket 12 is obtained in the manner illustrated in FIG. 6 by a spreading tool 33 forming no part of the invention hereof. The tool is of a jack screw type and is commercially available or can be readily improvised for this purpose. Briefly and for discussion, the tool includes a body section 34 from which radially extends a flange 35 terminating in a foot 36. Near the other end of the tool is a second flange 37 likewise terminating in a foot 38 and mounted on a jack shaft 39 telescopically received within the body. Spring 40 connected to flange 37 urges its return toward the body.

Figure 2:
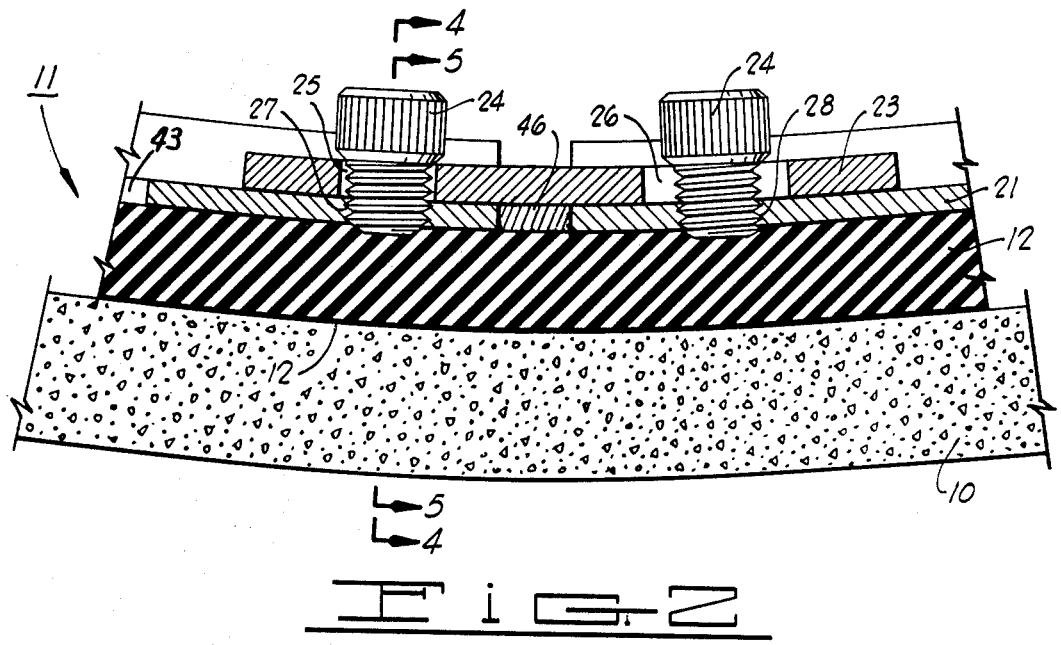
FIGS. 2 and 3 are each enlarged fragmentary sectional views taken from the portion indicated encircled on FIG. 1.
Figure 3:
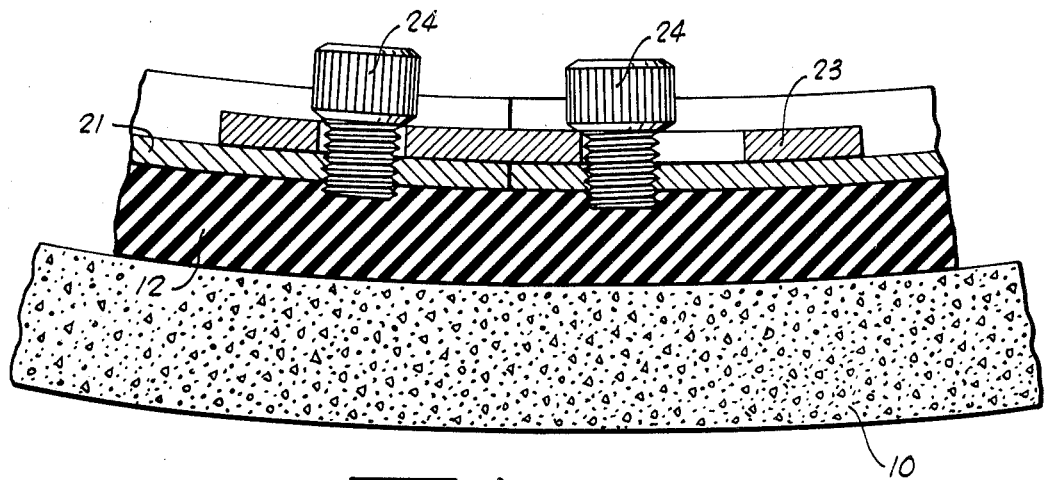

For accommodating the tool, each backing ring segment includes an aperture 42 and 43 near opposite ends thereof and which receive the tool in the manner shown. Hand wheel 44, when rotated, screws axially of the body and causes shaft 39 to extend or withdraw. As shaft 39 extends, it causes the affected adjacent segments to displaceably spread apart sufficiently to permit reception of a filler segment 46, as of a sawed off section of channel, therebetween. Only a sufficient number of filler segments are supplied to ensure appropriate initial compression of the self sealing gasket lips 16 against the pipe wall. A comparison of FIGS. 2 and 3 illustrate the abutting conditions with and without the filler member respectively. After a sufficient number of filler pieces has been inserted, the installation is complete and thereafter line pressure is relied on for maintaining seal against leakage. This can perhaps be better appreciated by considering the radially outward force component of the line liquid exerted against the exposed edge portion of the inner gasket surface on each side of the backing ring.

By the above description, there has been disclosed a novel repair clamp specifically adapted for use with large size pipe carrying water or the like. The clamp is relatively simple in construction, and is easily installed with a minimum of labor and expense without the attendant problem of a plurality of excavations assoociated with such prior art devices. The low profile of the clamp minimizes pressure loss to the fluid passing thereover and in an embodiment of the size described above, extends radially inward approximately 1⅝ inches from the pipe wall to the top of the head screw. This dimension could be more or less depending on circumstances of the installation and what pressure drops can be tolerated by the system.

Since many changes could be made in the above construction and many apparently widely different embodiments of this invention could be made without departing from the scope thereof, it is intended that all matter contained in the drawing and specification shall be interpreted as illustrative and not in a limiting sense.

The embodiments of the invention in which an exclusive property or privilege is claimed are defined as follows:

1. An inside clamp for repair of a leak gap in a piping system comprising in combination:
   (a) an annular flexible gasket having axially extending exposed end portions and a puckered radially outer surface for engagement against an inner pipe wall spanning a leak gap thereat, and
   (b) a backing member circumferentially extending centrally about the radially inner surface of said gasket in circumferential compressive relation thereagainst,
   (c) said backing member having a width in an axial direction less than said gasket to expose at least the axially extending end portions of said inner gasket surface to the line contents of the piping system, and
   (d) said exposed gasket end portions being responsive to line content pressure of a piping system in which it is installed to increase gasket sealing pressure against the pipe surface thereat.

2. The clamp according to claim 1 in which said puckered gasket surface is comprised of a plurality of axially displaced annularly extending alternate lips and grooves.

3. The clamp according to claim 2 in which the backing member is circumferentially split in width into contiguous sections along a plane for support substantially radially coextensive with the pipe gap to be repaired.

4. The clamp according to claim 3 in which each contiguous section is of a channeled cross-section.

5. The clamp according to claim 2 in which said backing member is comprised of a plurality of assembled end-to-end arc on chord segments.

6. The clamp according to claim 5 in which fillers are contained between at least some of said end-to-end segments to effect a predetermined circumferential compressive relation of the backing member against said gasket.

7. The clamp according to claim 5 including a splice plate overlying the ends of adjacent segments securing said segments in assembled relation and having circumferentially spaced apertures through which to receive screws for screwed securement to each of the respective adjacent segments.

8. The clamp according to claim 7 in which at least one of the apertures in said splice plate has a circumferential extent substantially greater than the screw diameter to be received therein permitting circumferentially adjustable setting of a segment relative thereto.

9. The clamp according to claim 1 in which said gasket is centrally recessed to receive said backing member.

10. The clamp according to claim 6 in which at least some end-to-end segments have surface recesses to receive a tool for spreading the segments sufficient to accommodate said fillers.

References Cited

UNITED STATES PATENTS

| 1,788,845 | 1/1931 | Reynolds | 138—90 X |
| 3,101,743 | 8/1963 | Hoke | 138—97 |
| 3,104,884 | 9/1963 | Kerlin | 285—110 |
| 3,334,928 | 8/1967 | Schmunk | 285—110 |

FOREIGN PATENTS

| 1,218,233 | 6/1966 | Germany. |

HERBERT F. ROSS, Primary Examiner

U.S. Cl. X.R.

285—109, 239